(12) United States Patent
Srinivasa et al.

(10) Patent No.: US 7,292,960 B1
(45) Date of Patent: Nov. 6, 2007

(54) METHOD FOR CHARACTERIZATION, DETECTION AND PREDICTION FOR TARGET EVENTS

(75) Inventors: Narayan Srinivasa, Oak Park, CA (US); Qin Jiang, Woodland Hills, CA (US); Leandro G. Barajas, Troy, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 11/427,825

(22) Filed: Jun. 30, 2006

(51) Int. Cl.
*G06F 17/40* (2006.01)
*G06F 17/00* (2006.01)
*G06F 19/00* (2006.01)

(52) U.S. Cl. .............. 702/185; 340/500; 340/679; 700/90; 700/108; 702/127; 702/179; 702/182; 702/183

(58) Field of Classification Search .......... 340/500, 340/511, 679, 680; 700/90, 108, 110; 702/33, 702/34, 35, 127, 179, 180, 182, 183, 184, 702/185, 188
See application file for complete search history.

(56) References Cited

U.S. PATENT DOCUMENTS 5,465,321 A * 11/1995 Smyth ..................... 706/20
7,089,250 B2 * 8/2006 Doganata et al. ........ 707/100
7,117,108 B2 * 10/2006 Rapp et al. .............. 702/71
2002/0054694 A1 * 5/2002 Vachsevanos et al. ... 382/111
2003/0065409 A1 * 4/2003 Raeth et al. .............. 700/31
2005/0080806 A1 * 4/2005 Doganata et al. ........ 707/102

FOREIGN PATENT DOCUMENTS

| JP | 03-52517 A | * | 3/1991 |
| JP | 07-37186 A | * | 2/1995 |
| JP | 7-168619 A | * | 7/1995 |

* cited by examiner

*Primary Examiner*—Edward R Cosimano (57) ABSTRACT

A method for characterizing, detecting and predicting an event of interest, a target event, based on temporal patterns useful for predicting a probable occurrence of the target event is disclosed. Measurable events and their features are defined and quantized into event classes. Temporal series of the event classes are analyzed, and preliminary prediction rules established by analyzing temporal patterns of the event classes that precede an occurrence of the target event using a sliding time window. The quality of the preliminary prediction rules is evaluated and parameters thereof are optimized by using a defined fitness function, thereby defining finalized prediction rules. The finalized prediction rules are then made available for application on temporal series of the event classes to forecast a probable occurrence of the target event.

23 Claims, 9 Drawing Sheets

| Data Name<br>Data.dat | | Subsystem Code<br>1234 | Fault Code<br>12345678 |
|---|---|---|---|
| Window Size<br>333 hr | Bin Size<br>2.4375 min | Number of Classes<br>10 | |
| | Class Definition (minute):<br>Cls1:[1.0167, 3.454); Cls2:[3.454, 5.892); Cls3:[5.892, 8.329);<br>Cls4:[8.329, 10.767); Cls5:[10.767,15.642); Cls6:[15.642, 20.517);<br>Cls7:[20.517, 25.392); Cls8:[25.392, 30.267); Cls9:[30.267, 57.079); Cls10:[57.079, 120.454). | | |
| *Target<br>Cls10 | Predictive Class Sequence<br>Cls1, Cls2, Cls3, Cls4, Cls5, Cls6, Cls7, Cls9 | No. of Targets<br>7 | |
| Precision<br>100.00% | False Alarm<br>0.00% | Accuracy<br>90.91% | FP Rate<br>0.00% |
| Target<br>Cls7 | Predictive Class Sequence<br>Cls1, Cls2, Cls3, Cls6, Cls8, Cls9 | No. of Targets<br>6 | |
| Precision<br>100.00% | False Alarm<br>0.00% | Accuracy<br>100.00% | FP Rate<br>0.00% |
| Target<br>Cls9 | Predictive Class Sequence<br>Cls1, Cls2, Cls3, Cls5, Cls6, Cls7, Cls8 | No. of Targets<br>7 | |
| Precision<br>100.00% | False Alarm<br>0.00% | Accuracy<br>87.50% | FP Rate<br>0.00% |

Fig. 10

METHOD FOR CHARACTERIZATION, DETECTION AND PREDICTION FOR TARGET EVENTS

BACKGROUND OF THE INVENTION

The present disclosure relates generally to a tool, method and product for forecasting an event of interest, and particularly to a method for forecasting an event that has a low frequency of occurrence, but a high impact or cost upon its occurrence.

Learning to predict infrequent but correlated sub-sequences of events is a difficult problem. There are several real world problems that can be categorized in this manner such as attacks in computer networks, fraudulent transactions in a financial institution and prediction of machine downtime in manufacturing assembly lines. Common factors that make it difficult to learn to recognize these events include: few examples of the target class to be learned; limited data samples; events occur at uneven inter-arrival times; and, time recordings and duration of measurable events only approximate their true values.

Event classification algorithms typically follow a discriminant description strategy wherein the discriminant boundaries that separate the regions of the class are estimated from data. In contrast to these methodologies, it would be advantageous to have a methodology where the data is not only temporal in nature, but is also based on a characteristic description strategy wherein the target events are first identified/characterized (such as events that occur rarely and have a large impact upon occurrence) and then validated against the negative class (that is, event classes that are not rare or do not have large impacts or costs). These validations could then be extracted as rules for classifying the data. The process of integrating classification and rule extraction and association is well studied in literature (see: K. Ali, S. Manganaris and R. Srikant, "Partial classification using associative rules," *ACM Sigmoid Management of Data*, pp. 115-118, 1997; R. Bayardo, "Brute-force mining of high confidence classification rules," *Proc. of Third International Conference on Knowledge Discovery and Data Mining*, pp. 123-126, 1997; D. Meretakis and B. Wuthrich, "Classification as mining and use of labeled item sets," *ACM SIGMOD Workshop on Research Issues in Data Mining and Knowledge Discovery* (DMKD-99), 1999; W. Pijls and R. Potharst, "Classification and target group selection based upon frequent patterns," *Proc. of Twelfth Belgium-Netherlands Artificial Intelligence Conference* (BNAIC00), pp. 125-132, 2000; G. Dong, X. Zhang, L. Wong and J. Li, "Caep: Classification by aggregating emerging patterns," *Proc. of International Conference on Discovery Science,* 1999; and, B. Liu, W. Hsu and Y. Ma, "Integrating classification and association rule mining," *Proc. of Fourth International Conference on Knowledge Discovery and Data Mining* (KDD-95), 1995, for example). However, these approaches mine for more than just the target/large events, thereby making the storage and search of events inefficient.

Other literary works, such as: G. Weiss and H. Hirsh, "Learning to Predict Rare Events in Event Sequences," *Knowledge Discovery and Data Mining*, pp. 359-363, 1998; for example, relate to mining for target events and predicting its occurrence along an event sequence. However, these methods only identify time windows that are predictive of target/large events, not target event sets or sub-sequences that are constructed entirely from the negative class but are predictive of the positive class, or large event.

Yet other literary works, such as: R. Agarwal and R. Srikant, "Mining Sequential Patterns," *Proc. of 11th International Conference on Data Engineering*, ICDE, pp. 3-14, 1995; H. Mannila, H. Toivonen and A. I. Verkamo, "Discovering frequent episodes in sequences," *Proc. of International Conference on Knowledge Discovery and Data Mining* (KDD-95), 1995; for example, consider the temporal distribution of the negative class within a time window, which may result in an overly limiting methodology.

Further literary work, such as: R. Vilata and S. Ma, "Predicting Rare Event In Temporal Domains," *International Conference on Data Mining*, 2002, for example, estimate the size of time window by trial and error, require pre-labeled data wherein each data point belongs either to one of the negative class examples or a positive class example, and assume a fixed set of negative class types.

Accordingly, there is a need in the art for a classification algorithm that results in a set of prediction rules useful for predicting the probable occurrence of a target event while overcoming the aforementioned drawbacks.

BRIEF DESCRIPTION OF THE INVENTION

An embodiment of the invention includes a method for characterizing, detecting and predicting an event of interest, a target event, based on temporal patterns useful for predicting a probable occurrence of the target event. Measurable events and their features are defined and quantized into event classes. Temporal series of the event classes are analyzed, and preliminary prediction rules established by analyzing temporal patterns of the event classes that precede an occurrence of the target event using a sliding time window. The quality of the preliminary prediction rules are evaluated and parameters thereof are optimized by using a defined fitness function, thereby defining finalized prediction rules. The finalized prediction rules are then made available for application on a temporal series of the event classes to forecast a probable occurrence of the target event.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides an algorithm for detecting predictable large events from measurable data, such as may be used for machine health management in e-manufacture. In an embodiment, the history repair-time data is first converted into event classes using histograms and more generically multidimensional feature-based agglomerative clustering over the data. Then, an event analysis technique is used to extract prediction rules (predictive event patterns) for each large or relevant event (an event with a large repair-time, high importance or high cost). Finally, an event prediction procedure is used to evaluate the effectiveness of each prediction rule as a predictor for the corresponding large event. The predictability of detected large events and the effectiveness of their prediction rules are highly affected by a set of system parameters, such as histogram bin size, analysis window size, the number of event classes in the event definition, and target event ID. In order to achieve optimal results in detecting predictable large events, a genetic algorithm (GA) is applied to search for optimal values for the system parameters in the parameter space.

In an embodiment, the event classes may result from more than one data set, thereby enabling multivariable predictions. By employing an embodiment of the invention, large events from the analysis of measurable data may be detected in order to prevent the same large event from happening in the future, or to be prepare for resolution if the large event does happen. An advantage of this invention is that it enables machine health management to take action before a large event happens, which is very helpful for the prognostics of machine health maintenance in terms of cost saving, labor allocation, and throughput improvement.

It is anticipated that embodiments of this invention may be applied to machine health maintenance in e-manufacture as well as other machine or device health management programs, and to the prognostics of electronics and communication/computer networks (for example, the desired feature to detect for this application could be the CPU time load on the network during peak hours of operation that occurs rarely but is important to address to guarantee maximum satisfaction for all users during all times), stock market or any other times series data (here the problem could be set up with the daily stock prices to be the raw data and the target event to be detected will be the peak in price or fall in price within a user-defined period such as a week, month, year etc).

Figure 1:
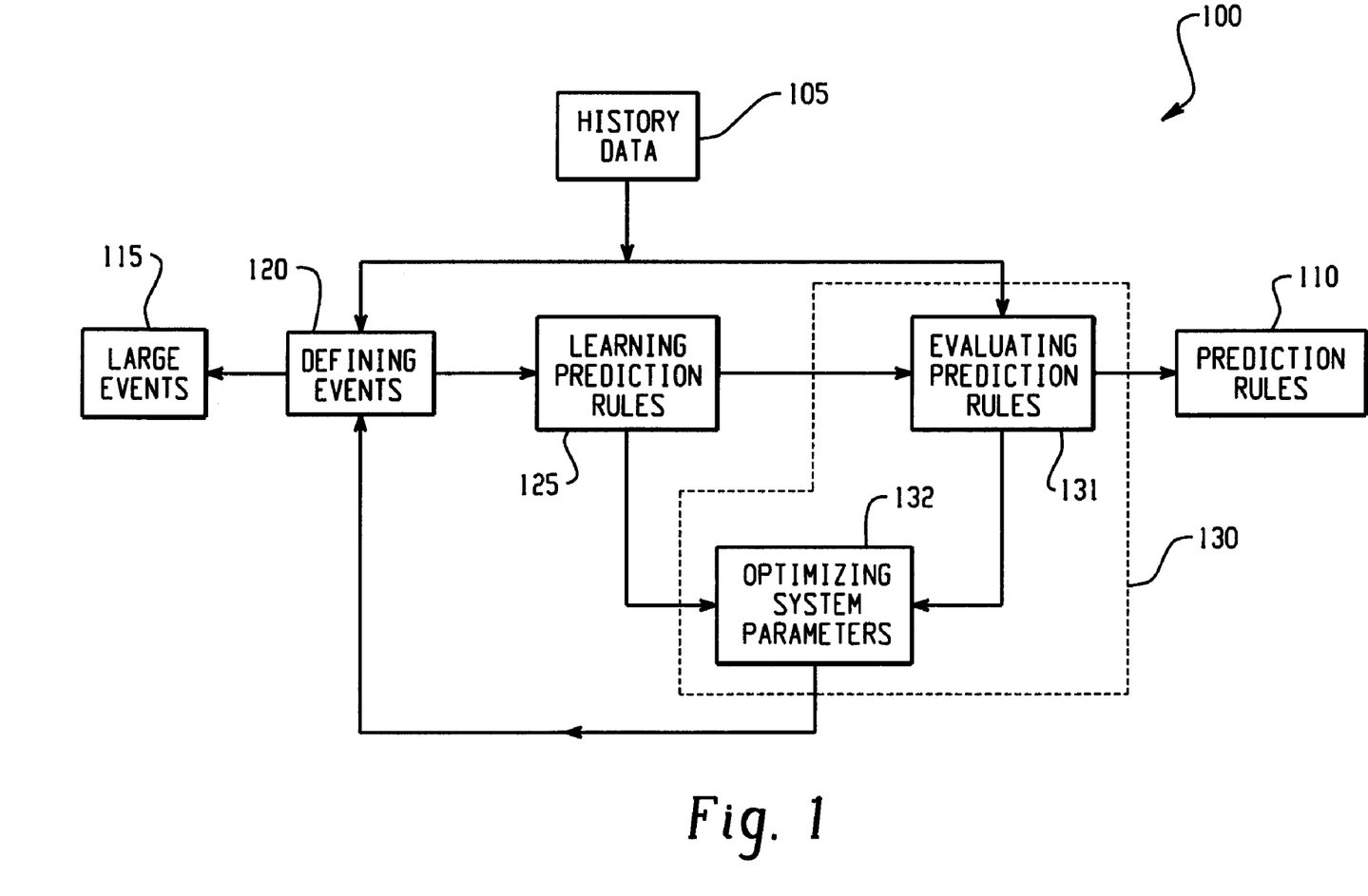
FIG. 1 depicts a method flowchart in accordance with an embodiment of the invention.

Referring now to FIG. 1, a method flowchart 100 illustrating an embodiment of the invention is depicted. In general, the method 100 is useful for forecasting an event of interest, a target event, based on temporal patterns useful for predicting a probable occurrence of the target event. Historical temporal data 105 is provided as initial input to ultimately establish finalized prediction rules 110 that are useful for predicting an event of interest (large event) 115, which is also herein referred to as a target event.

To detect large events (events with large repair-times for example), it is necessary to first define event classes, their boundaries and probabilities based on the repair-time (or other measurable event) from the data sequence. It should be noted that different event definitions will yield different results of large event detection. The goal is to find an optimal event definition that can produce the best results in terms of target event prediction. The event definition process is basically the process of repair-time (or any other signal or process feature—in the case of stock market for example it can be stock value, or volume) quantization and clustering. In an embodiment of the invention, the event definition is achieved by agglomerative clustering. In another embodiment, the event definition can be achieved by using any other kernel based method as support vector machines (SVM). First, a histogram of repair times in the data sequence is constructed. Initially, every non-zero bin in the histogram of repair-time is treated as an event class. Alternatively, all of the sampled data is utilized as opposed to actually creating a histogram. Then, every class is merged with one of two neighbors that are similarly based on the repair time duration. This process of merging, or agglomerating, is repeated until a given number of event classes is obtained. The rule of merging can be described as follows:

Let $C_{old}$ be an old class and $N_1$ and $N_2$ be its two neighbors. The distances between the old class and its two neighbors, $N_1$ and $N_2$, are denoted as $d_1$ and $d_2$. Then, we have:

$$d_1 - d_2 > d_2 \Rightarrow C_{new} = C_{old} \oplus N_2$$

$$d_2 - d_1 > d_1 \Rightarrow C_{new} = C_{old} \oplus N_1$$

$$|d_1 - d_2| < \min(d_1, d_2) \Rightarrow C_{new} = C_{old} \oplus \min(N_1, N_2)$$

where the notation $\oplus$ means "merging/agglomerating with". Since the bin size of the histogram and the number of event classes play a role in the event definition, they are optimally selected by a GA procedure as outlined below. It is important to note that the search for these parameters by the GA is performed in an integrated fashion along with other parameters that need to be searched. Following this agglomerative clustering process, measurable events are defined 120 and then quantized into event classes. An exemplary measurable event is the repair time for a machine, and an exemplary quantization is the segmenting of the repair time into different durations of repair time. Such a quantization can be depicted as a temporal series of event classes (repair times for example), or in histogram form with the histogram bins representing different repair times.

By analyzing the temporal series of event classes in the historical temporal data, preliminary prediction rules for predicting the probable occurrence of a target event can be established 125 by analyzing temporal patterns of the event classes that precede an occurrence of the target event using a sliding time window.

The quality and optimizing parameters of the preliminary prediction rules are evaluated 130 using a defined fitness function, thereby defining finalized prediction rules 110. The finalized prediction rules 110 are then made available for application on a temporal series of the event classes to forecast a probable occurrence of the target event.

In an exemplary embodiment of the invention, the target event has a low frequency of occurrence, but a high impact upon its occurrence, relative to all of the other event classes. As will be seen and discussed further below, the event classes included in the analysis include both the target event and non-target events, but only the non-target events are used to define the finalized prediction rules.

When analyzing the temporal patterns of the event classes to establish 125 the preliminary prediction rules, only the event classes in the sliding window that proceed an occurrence of the target event are considered. These sets of event classes are referred to and defined as related events. The temporal order of the related events is not considered in defining the finalized prediction rules. When quantizing the defined measurable events into event classes, a histogram of the measurable events is created, and neighboring bins of the histogram are merged until a defined number of event classes are established.

Figure 2:
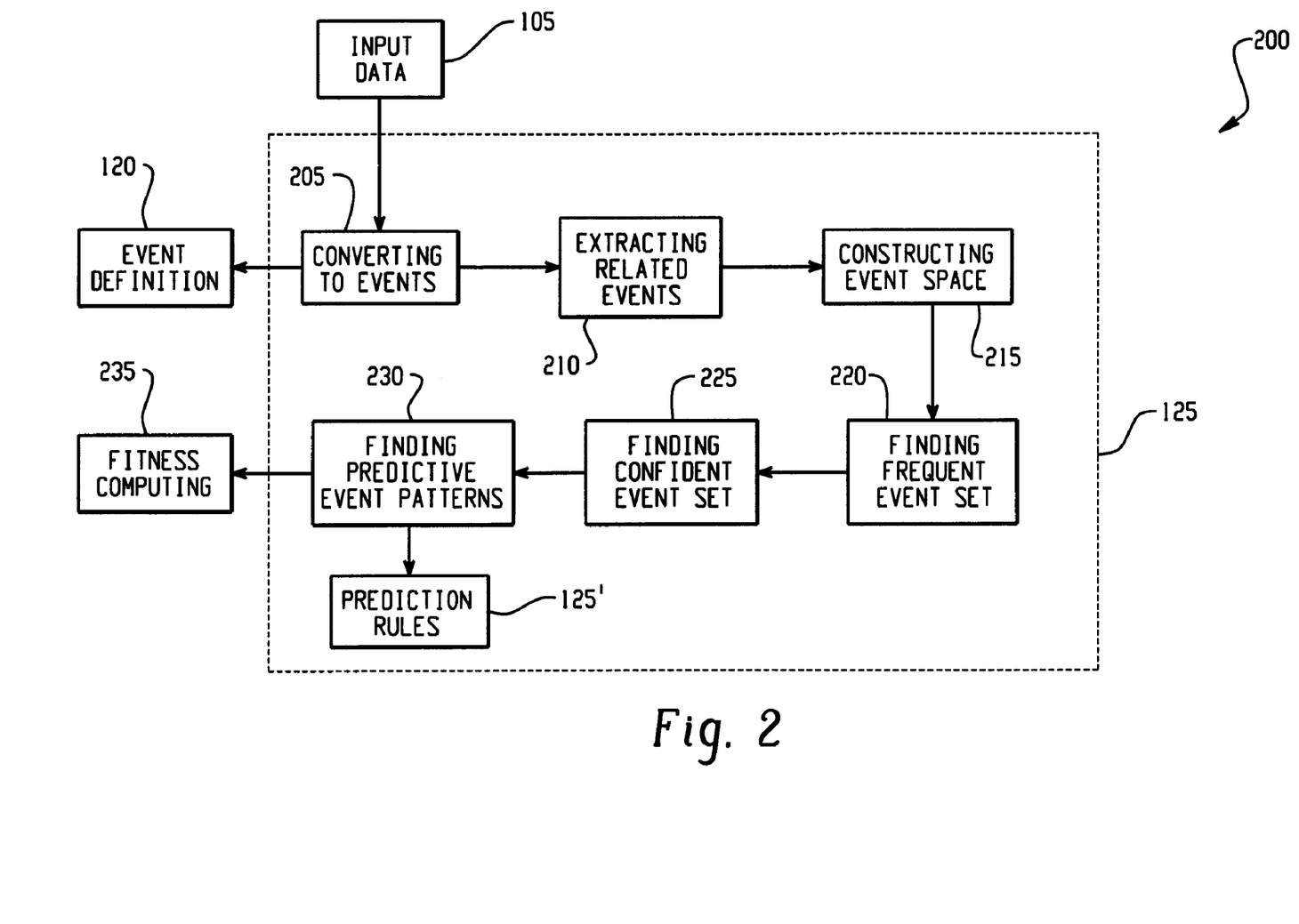
FIG. 2 depicts a method flowchart representing an expanded version of a portion of the method of FIG. 1.

Referring now to FIG. 2, a method flowchart 200 representing an expanded version of the method of block 125 of FIG. 1 is depicted. With the event definition (clusters of repair time for example) having been defined at block 120, the input data sequence 105 is converted 205 into a sequence of event classes, which is herein referred to as clustering into bins. The temporal series of the event classes are analyzed to find all analysis time windows preceding the target event, and sets of the related events are extracted 210 from the analysis time windows. The size of the analysis time window for extracting related events may be modified to find an optimal size, as will be discussed in more detail below. Using the sets of related events, an event space is constructed 215 containing all possible event patterns generated by the sets of related events. Here, the order of the related events in the event patterns is not considered, resulting in an event space that is a power set of the related events.

Using the event space, all frequent event sets, defined as an event set with a frequency of occurrence larger than a pre-defined minimum, are found 220. Exemplary formal definitions of a frequent event set is given by:

"Definition-1: An even set x is a set of event class. Event set x matches the set of a time analysis window, if every event class is found in the window."

"Definition-2: Event set x has supports in PW (event space) if s % of all windows of size W preceding target events are matched by x. Event set x is frequent if is above a minimum user-defined threshold.

Let PW denote the event space and WS denote the set of all analysis window sets preceding target events. Then, the procedure of finding frequent event sets can be presented as follows:

i. To compute the cardinality of the set WS, denoted by $WS_{cardinal}$.

ii. $\forall x \in PW$, to compute the number of matched window sets in WS by x, denoted by $WS_{matched}$.

iii. The frequency of x occurring in WS is calculated by $$f_x = WS_{matched}/WS_{cardinal} \qquad \text{Equation-1}$$

iv. For a given minimal support s, to construct frequent event set F by $$F = \{x: \forall x \in PW, f_x \geq s\}". \qquad \text{Equation-2}$$

Since the frequent event set is used in determining the prediction rules, which are used to compute a fitness value for a GA procedure, discussed in more detail below, to obtain optimal system parameters, if the frequent event set is an empty set, the value of fitness is set to zero. This means that for a null frequent event set there does not exist statistically meaningful event patterns in the analysis windows to predict the given target event.

Using the event space, confident event sets, defined as an event set with a confidence measure for predicting the occurrence of the target event larger than a pre-defined minimum, are found 225. Since the frequent event set only tells how often the set occurs before a target event, and doesn't tell how often it may predict the occurrence of other non-target classes, the confident event set provides a measure of this feature. An exemplary definition of a confident event set is given by the following:

"Definition 3: Event set x has confidence c in PW (event space) if c % of all time windows of size W matched by x precede a target event. Event set x is accurate if c is above a minimum user-defined threshold.

Let WS2 denote the set of all window sets that don't precede a target event, and $a_1$ and $a_2$ denote the numbers of matched window sets by set x in both WS and WS2. The confidence of x is computed as follows:

$$cf_x = a_1/(a_1+a_2) \qquad \text{Equation-3}$$

The confidence is an estimation of the conditional probability of x belonging to a time window that precedes a target event, given that x matches the target event in that same time window. For a given minimum confidence c, confident event set is constructed by the following equation:

$$CF = \{x: \forall x \in PW, cf_x \geq c\} \qquad \text{Equation-4}$$

To ensure that the probability of an event set x appearing before a target event is much larger than the probability of x not appearing before target events, a hypothesis testing process is run to validate confident event sets. The hypothesis test is defined as:

$$H_0: P(x/WS) \leq P(x/WS2) \qquad \text{Equation-5}$$

and $$H_1: P(x/WS) > P(x/WS2). \qquad \text{Equation-6}$$

By rejecting the null hypothesis, we can obtain the final confident event set given as:

$$CF = \{x: \forall x \in PW, cf \geq c_x, P(x/WS) > P(x/WS2)\}." \qquad \text{Equation-7}$$

If the confident event set is an empty set, fitness value is set equal to zero. In the case of an empty (null) set, event patterns occur too often in non-target analysis windows and so will be completely useless as a predictor.

At block 230, target event predictors are defined as the intersection of both the frequent event sets (F) and the confident event sets (CF). The event pattern predictive of a target event is expected to have both high frequency and high confidence. A way to select a desirable event pattern is given as follows:

Let $R = F \cap CF$, then the event pattern is obtained by the following equation:

$$patn = \max_{x \in R}(f_x + cf_x). \qquad \text{Equation-8}$$

If patn is an empty set, the fitness value is set to zero.

At block 235, a fitness function is evaluated, which will be discussed in more detail below. The output of block 125, which is fed into block 130, is the set of preliminary prediction rules, represented in FIG. 2 by reference numeral 125'.

Referring to FIG. 1, evaluation 131 of the quality of the preliminary prediction rules involves using the sliding window over the same historical data, analyzing the temporal series of the event classes to find an analysis time window containing a set of related events, determining whether a target event is present in the next sequential time window, and then based on this information, computing four values, TP (True Positive, TN (True Negative), FP (False Positive), and FN (False Negative) of a two-by-two confusion matrix. These four values are then used together with process and algorithm parameters (like prediction rule length, cost of FP/FN/TP/TN, and required convergence speed) to compute a fitness score based on the defined fitness function. The fitness score is used to optimally select the values of the system parameters using a GA procedure to seamlessly integrate the clustering process with the rule prediction process into a single unified process.

The effectiveness of the target event predictors depends on several parameters: the bin size of the histogram during agglomerative clustering that defines the types of event classes, the number of event classes, the size of the sliding time window to identify the target event, and the choice of event class as the target class. In order to achieve an optimal solution, a GA is applied to search for optimal system parameters, represented by reference numeral 132 in FIG. 1, in the search space. The search is guided by the aforementioned fitness measures that are related to precision and recall values of the final classification.

The bin size of the histogram and the number of event classes (number of clusters) play an important role in the process of event definition, which is an integral part of the large event detection. The analysis window size is important in the learning prediction rule since different window sizes may produce quite different predictive event patterns, which determines the predictability of the large events. For a given data set, not every large event may be predictable, and it is desirable to use an optimization procedure in selecting the most predictable large event among all available large events. Therefore, a target event identifier (ID) is used as a system parameter for selecting the best large event. In an embodiment, a GA is used as the optimization procedure, represented by reference numeral 132 in FIG. 1, to search for the best values of the system parameters in the parameter space. An expanded version of the method of block 132 of FIG. 1 is presented in the method flowchart 300 depicted in FIG. 3.

Figure 3:
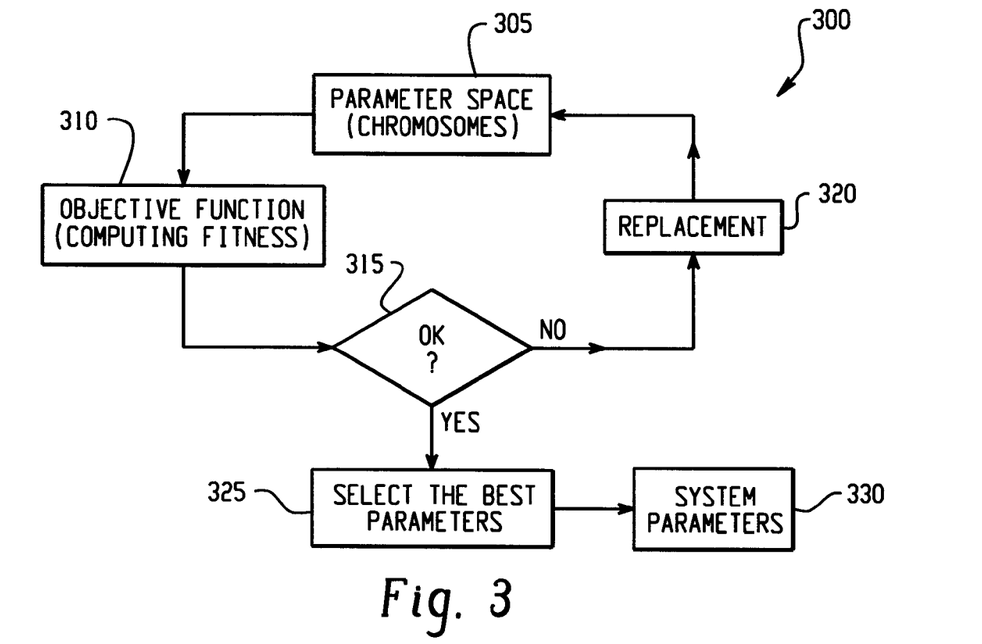
FIG. 3 depicts a method flowchart representing an expanded version of another portion of the method of FIG. 1.

Referring now to FIG. 3, in order to use GA to search for the optimal values of the set of system parameters, the parameters can be first encoded into binary codes, herein also referred to as chromosomes. The length of the binary codes is determined by the dynamic ranges and desired resolution of the parameters. In an embodiment, only the top three large event classes are considered as possible target classes. The dynamic ranges of exemplary parameters are given as follows:

1.) The size of sliding window: $W_1$ <window size< $W_2$
2.) The bin size of histogram: $B_1$ <bin size< $B_2$.
3.) The number of clusters: $N_1$ <number of classes< $N_2$.
4.) The target class: $T_1$ <=target class<= $T_2$.

Based on the ranges of the parameters, the overall length of the chromosome to encode the parameters can be determined. While specific system parameters are identified and discussed herein, it will be appreciated that this is for illustration purposes only and should not be construed as limiting in any way. Assuming the system parameters are positive integers or scaled fix point equivalents, the bit allocation for each variable $N_i$ in the encoding process is given by:

$$N_i = \left| \frac{\log(A_i)}{\log(2)} + 1 \right| \quad \text{Equation-9}$$

where $A_i$ is the dynamic range for the variable i. For example, in an embodiment, there are four variables (system parameters) with the settings for the dynamic range parameters as follows:

$W_1$=250 hours,
$W_2$=1024 hours,
$B_1$=1,
$B_2$=10,
$N_1$=5,
$N_2$=10,
$T_1$=1, and
$T_2$=3.

This implies that the following bit allocation for the four variables is:

1.) 11 bits for the sliding window size (reference numeral 405 in FIG. 4),
2.) 4 bits for the number of event classes (reference numeral 410),
3.) 7 bits for the histogram bin size (reference numerals 415 and 420), (3 bits for integer part, and 4 bits for decimal part added for extra resolution), and
4.) 2 bits for target class ID (target event class) (reference numeral 425).

Figure 4:
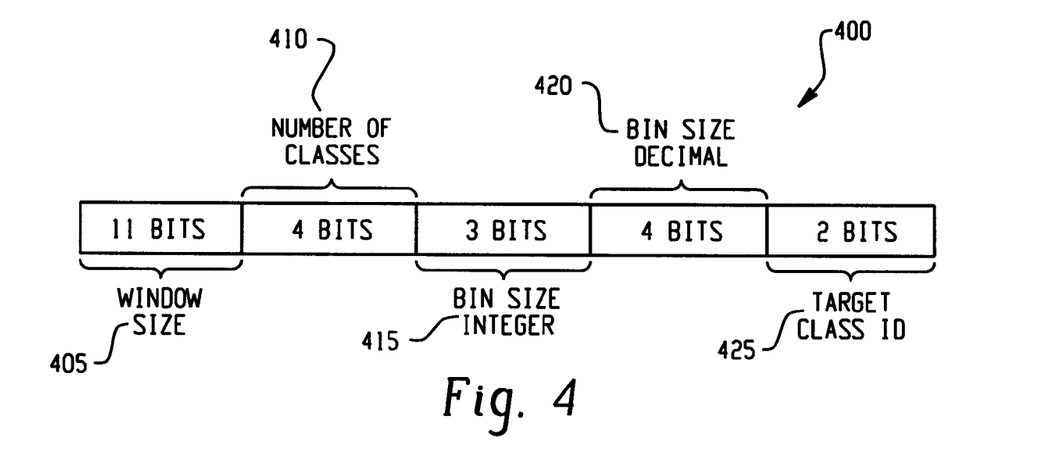
FIG. 4 depicts an encoded chromosome in accordance with an embodiment of the invention.

As can be seen from the foregoing, an encoded chromosome 400 is made up of a binary string having a plurality of binary string segments, with each segment defining a unique one of the system parameters.

In this exemplary embodiment, the locations of the bits in chromosome 400 are shown in FIG. 4. However, it should be noted that the order of the bit locations is not important in the encoding process. For the decoding process, a decoder would pick the bits for a parameter from its location in the chromosome and convert its binary code into a decimal/integer number.

With reference still the FIG. 3, the method 300 starts out at block 305 with the encoded chromosome 400 defining the parameter space.

Next, the fitness of the chromosome is computed 310, where the fitness depends on two valuations; one (also herein referred to as a first valuation method) is from the learning prediction rule 125, and the other (also herein referred to as a second valuation method) is from the evaluating prediction rule 131. In the learning prediction rule, every predictive event pattern has a frequent score and a confident score. The two scores measure the quality of the predictive event pattern as a predictor for its large event based on the analysis of history data. High values in the two scores mean that the corresponding large event is highly predictable. On the other hand, in the evaluating prediction rule, event prediction using the prediction rule is used to evaluate the effectiveness of each prediction rule as a predictor for the large event (target event predictor). Based on the rate of detecting target event, the evaluating prediction rule produces four values that are a function of confusion matrix: TP (True Positive), TN (True Negative), FP (False Positive), and FN (False Negative). With the four values, three scores are calculated: precision, accuracy, and FP rate, which are defined by the following equations:

Precision: Equation-10

Precision:
$$s_1 = \frac{TP}{TP+FP} \quad \text{Equation-10}$$

Accuracy: Equation-11

$$S_2 = \frac{TP+TN}{TP+TN+FP+FN} \quad \text{Equation-11}$$

FP Rate: Equation-12

$$S_3 = \frac{FP}{FP+FN}. \quad \text{Equation-12}$$

Additionally, the following metrics can be also used:

$$\text{Accuracy (AC)} = \frac{(TP+TN)}{(TP+TN+FP+FN)} = \frac{(TP+TN)}{\text{Total}} = \text{Efficiency}$$

$$\text{Precision (}P\text{)} = \frac{TP}{TP+FP} = \frac{TP}{\text{Predicted (+)}}$$

$$FPRate = \frac{FP}{FP+TN} = \frac{FP}{\text{Actual (}-\text{)}} = POFA$$

$$TPRate = \frac{TP}{TP+FN} = \frac{TP}{\text{Actual(+)}} = \begin{vmatrix} \text{Sensitivity} \\ \text{Recall (}R\text{), POD} \end{vmatrix}$$

$$FNRate = \frac{FN}{FN+TP} = 1 - TPRate$$

$$TNRate = \frac{TN}{TN+FP} = 1 - FPRate = \text{Specificity}$$

And also:

$$Corr_{Coeff} = \frac{TP'TN - FP'FN}{\sqrt{(TP+FN)(TP+FP)(TN+FP)(TN+FN)}}$$

g-mean$_1$=$\sqrt{P'R}$ g-mean$_2$=$\sqrt{TPRate'TNRate}$ $$F-\text{Measure} = \frac{(b^2+1)'P'R}{b^{2'}P+R}; b\hat{\imath}[0,¥)$$

$$F-\text{Score} = \frac{2'P'R}{P+R}$$

The optimal chromosome/large event is expected to have high values in the first two scores and a low value in the third score. Combined with the score of frequency and confidence of the prediction rule, the three scores are used to define the fitness of, or assess the value of, a chromosome in the GA optimization 132 as follows:

Fitness: Equation-13 fit=$S_1*S_2*(1-S_3)*S_4*$len, or in general:

fit=F($S_1, S_2, \ldots, S_N$, ProcParam1, ProcParam2, . . . , ProcParamM, AlgParam1, AlgParam2, . . . , AlgParamK, UserParameters), where F is an arbitrary function, ProcParam denotes process parameter, AlgParam denotes algorithm parameter, and where $S_4$=f+cf; f is the frequent score and cf is the confident score. The notation len is the length of the set of predictive patterns (prediction rule), that is, the length of the encoded chromosome 400. Inclusion of the length of the prediction rule in the fitness function reflects the fact that a prediction rule with many events is more robust in event prediction than a prediction rule with fewer events.

At block 315, it is determined whether the computed fitness score is within an acceptable range. If not, then logic passes to block 320 where the GA adjusts a parameter of the chromosome, and the fitness evaluation process is repeated. If the computed fitness score is acceptable, then logic passes to blocks 325 and 330 where the best system parameters are selected and established as the system parameters to be used in the finalized prediction rules for a subsequent analysis on another temporal series of the event classes to forecast a probable occurrence of the target event. Such a subsequent analysis may be conducted as a real-time data run, or as a data evaluation on stored data from a real-time data run.

As can be seen from the foregoing, a GA may be employed to select values for the system parameters for the encoded chromosome through optimization of the fitness function.

Figure 5A:
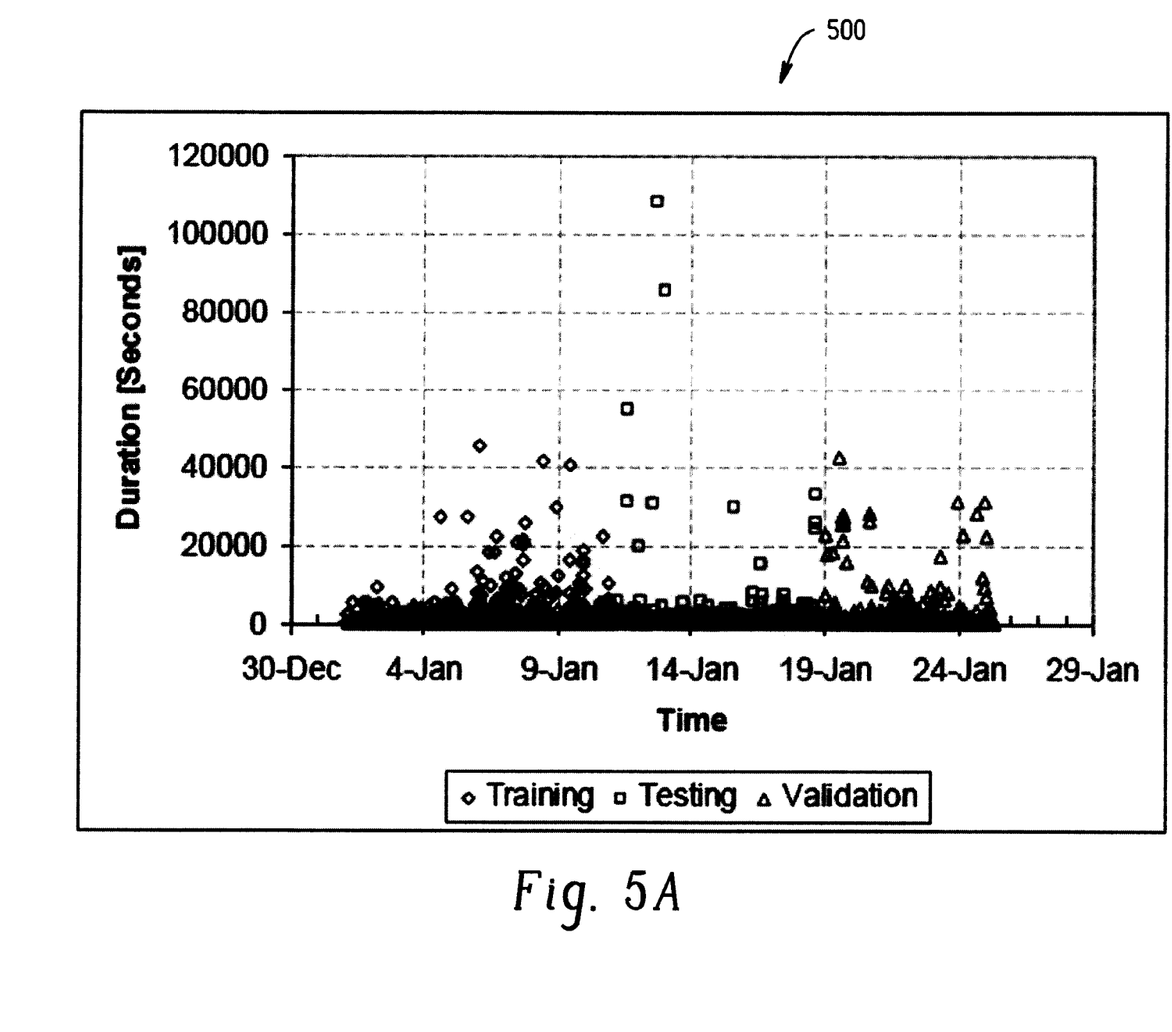
FIGS. 5A and 5B depict exemplary empirical data used for training, testing and validating an embodiment of the invention.
Figure 5B:
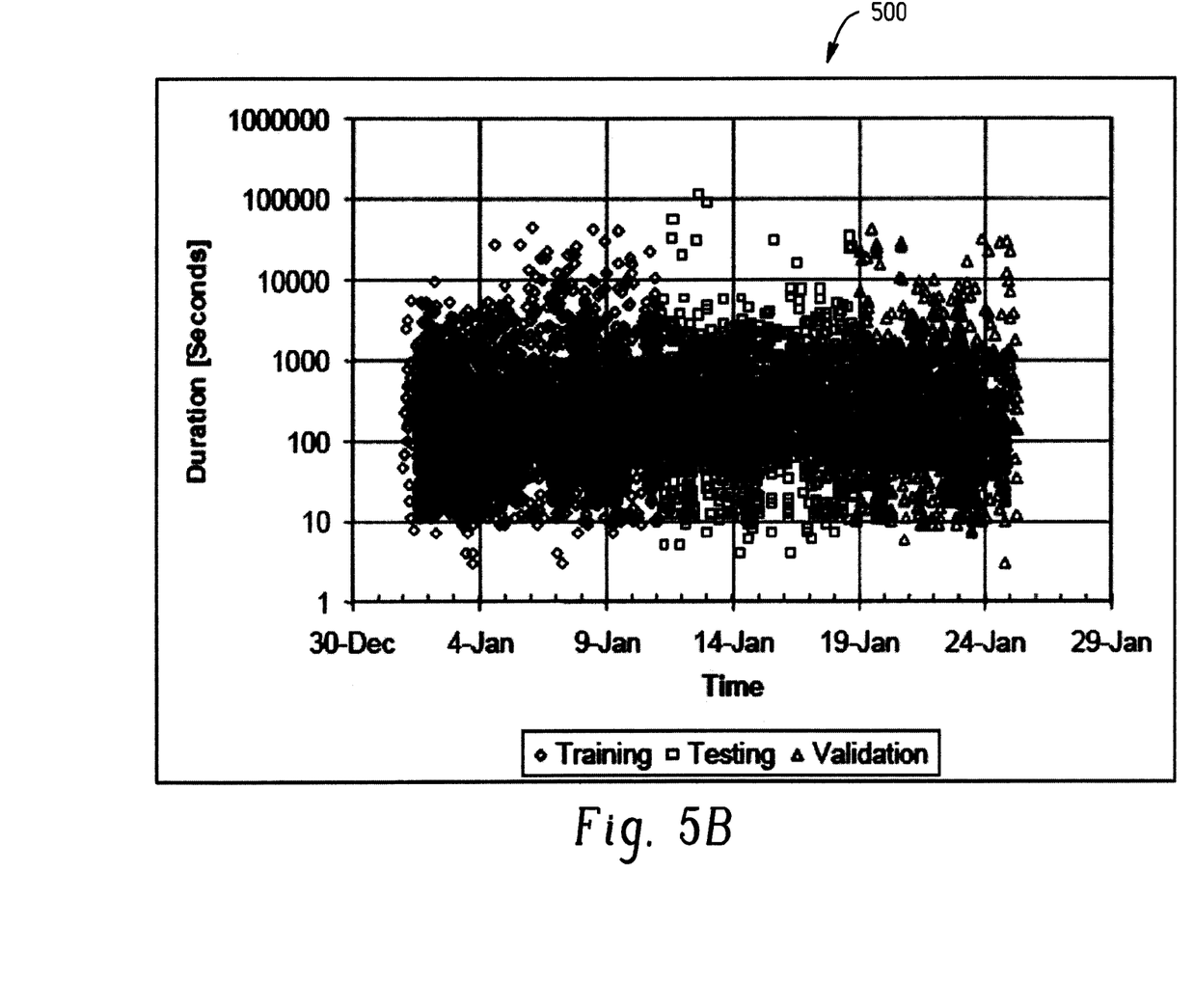

Referring now to FIGS. 5A and 5B (depicting different y-axis scales), experimental data 500 of Repair Time (Duration) versus Elapsed Time was recorded for a particular assembly line, with 3200 data points being used as training data (that is, data used for analyzing the temporal series of events for establishing, evaluating and optimizing the preliminary prediction rules to result in the finalized prediction rules), 1800 data points occurring subsequent to the 3200 data points being used to test out the finalized prediction rules, and 1500 data points occurring subsequent to the 1800 data points being used for validation purposes. Validation can be done by either: Cross Validation, Bootstrap Validation, or Sliding Window Validation. The data split between training, test and validation can also be done by time; in this case 12 days for training, 8 for testing, and 6 for validation.

Figure 6:
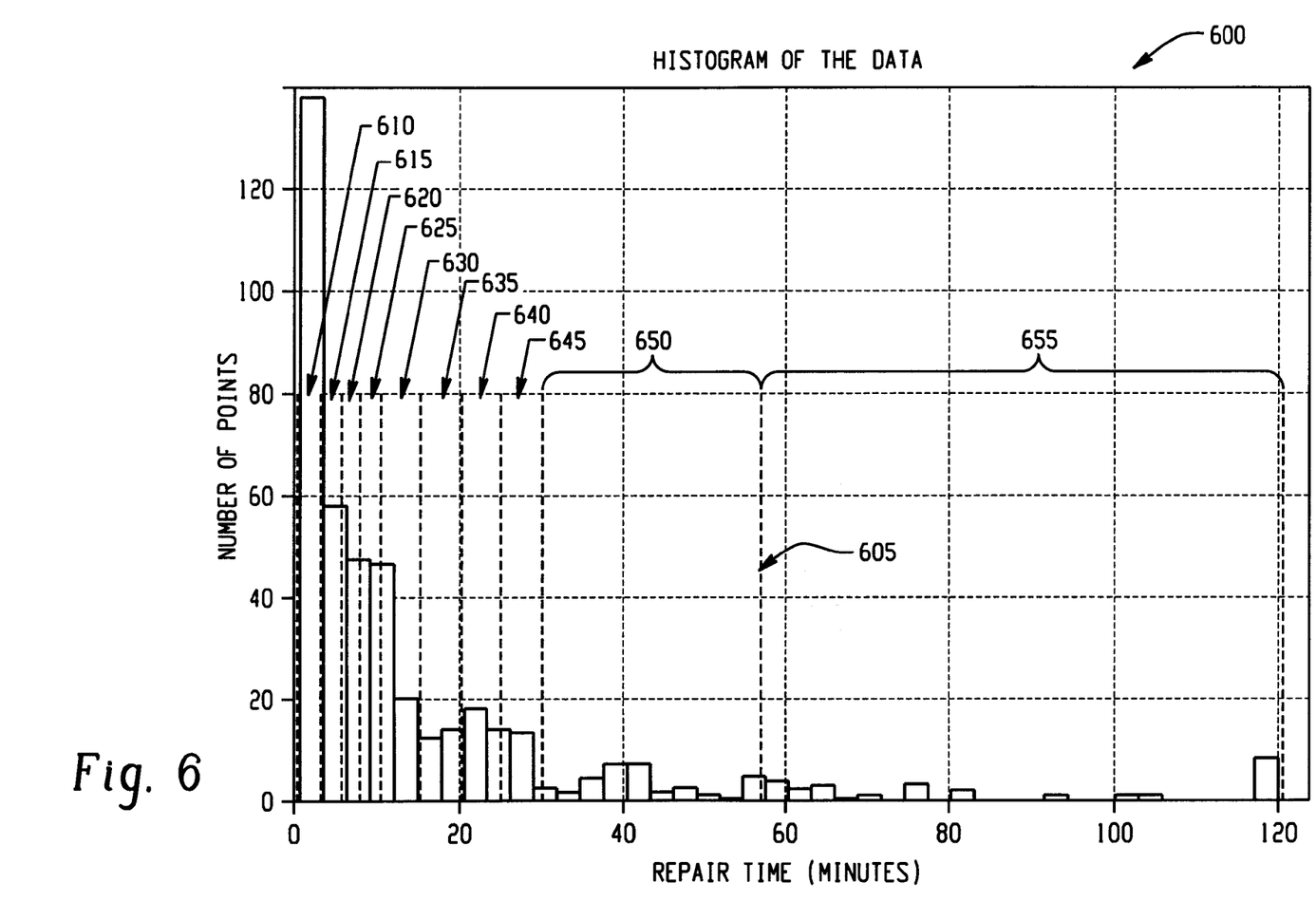
FIG. 6 depicts an exemplary histogram in accordance with an embodiment of the invention.

From the data in FIGS. 5A and 5B, a histogram 600 was generated as depicted in FIG. 6, with the measurable events (repair time) being quantized into different event classes (duration of repair time) as depicted by a plurality of dotted lines 605. As depicted in FIG. 6, eleven dotted lines define ten event classes 610, 615, 620, 625, 630, 635, 640, 645, 650 and 655, which are the result of agglomerative clustering performed on the individual data samples. The process of merging, or agglomerating, was repeated until a given desired number of event classes was obtained. In the example illustrated in FIG. 7, the resulting number of event classes is six (event class-1 through event class-6), with event class-6 being the target event. As can been seen from FIG. 7, the target event class-6 is that event class having a low frequency of occurrence (fewer number of data points) but a high impact upon its occurrence (high repair time).

Figure 7:
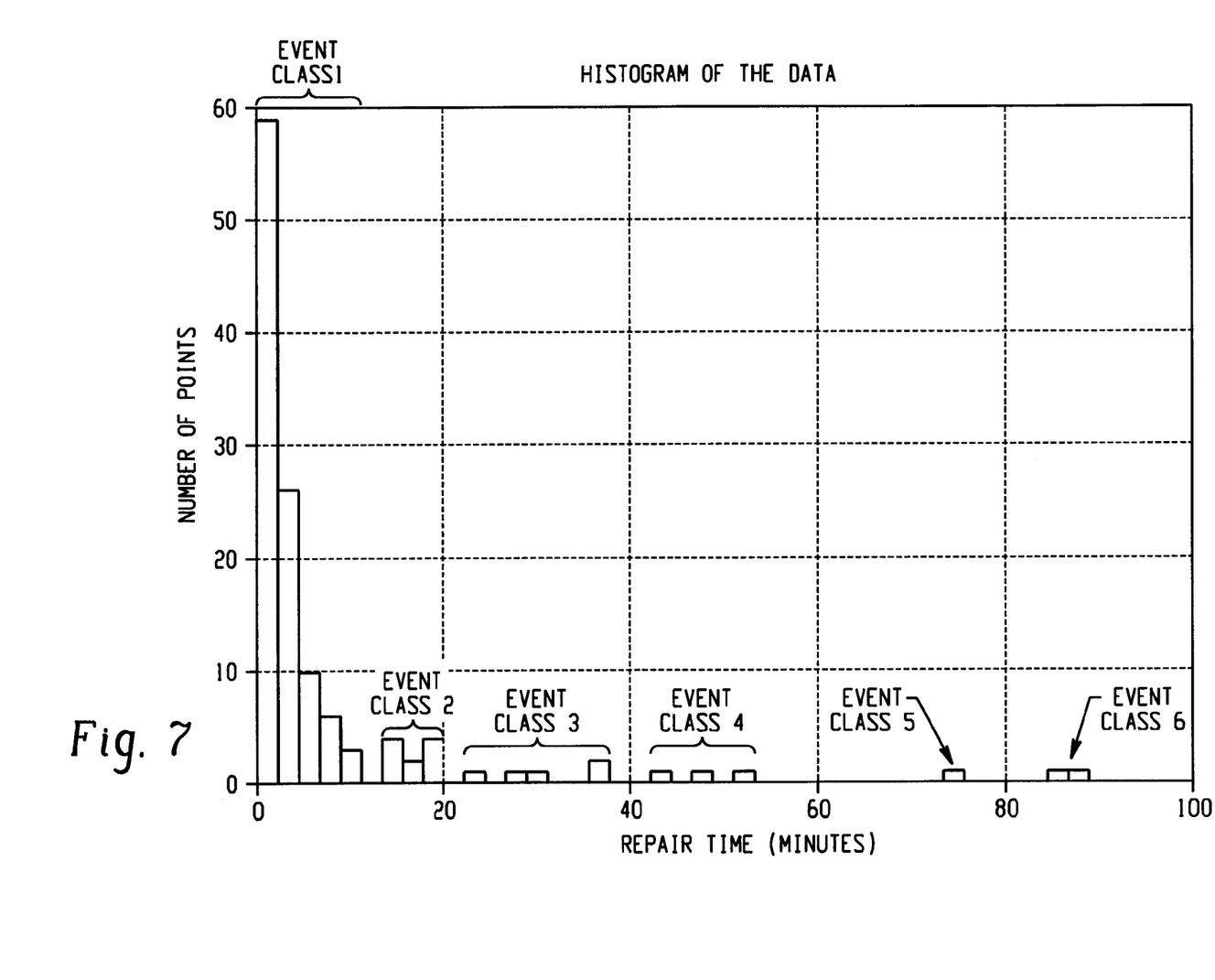
FIG. 7 depicts an exemplary histogram subsequent to an agglomerative clustering operation in accordance with an embodiment of the invention.
Figure 8:
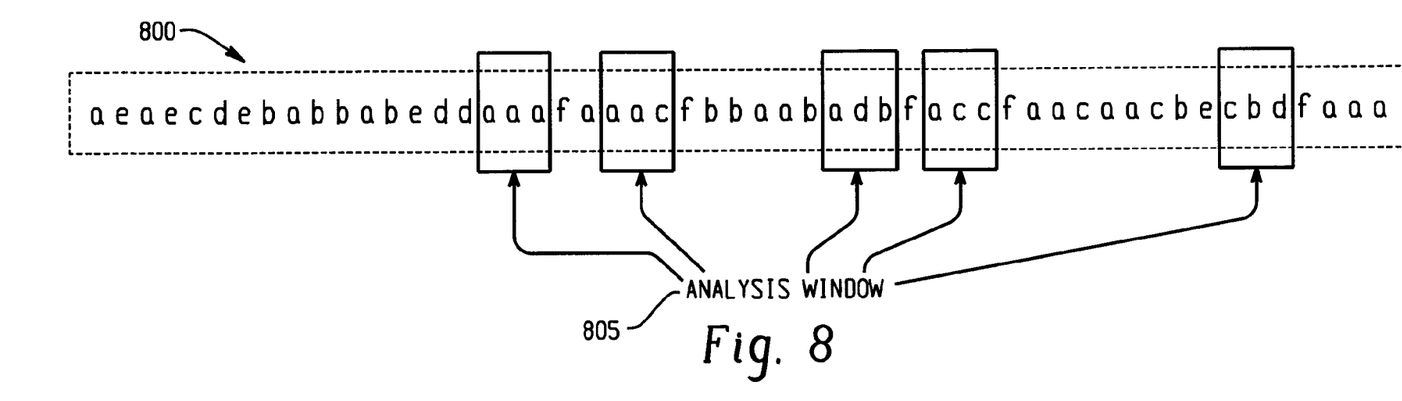
FIG. 8 depicts a temporal sequence of event classes with analysis windows in accordance with an embodiment of the invention.
Figure 9:
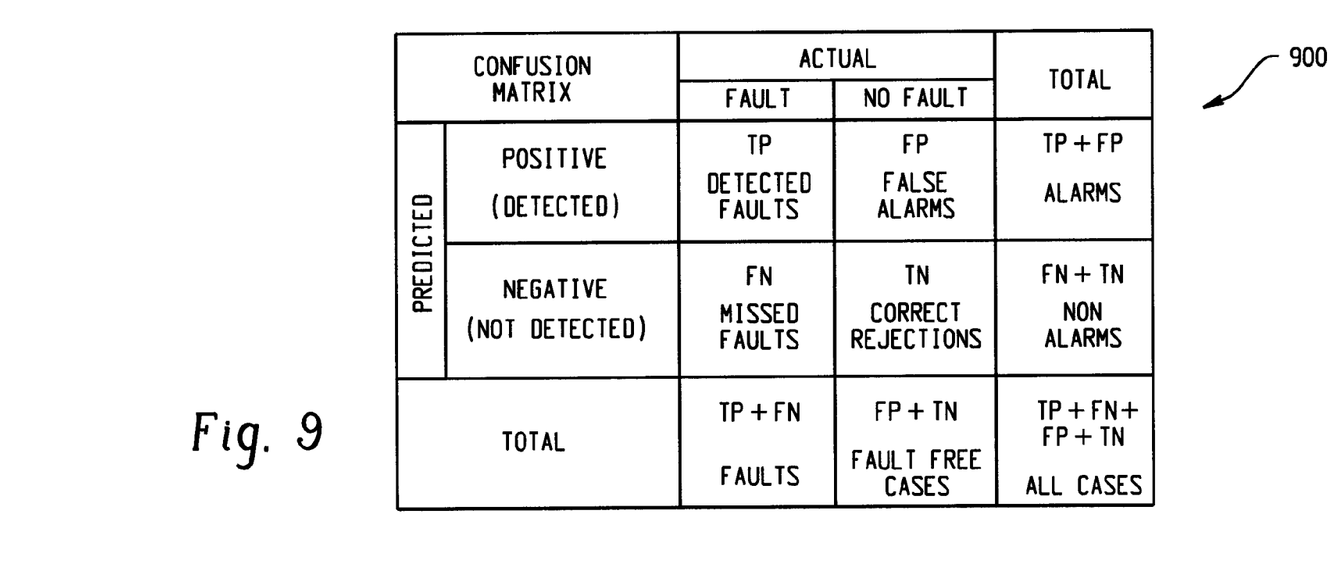
FIG. 9 depicts a confusion matrix for use in accordance with an embodiment of the invention.
Figure 10:
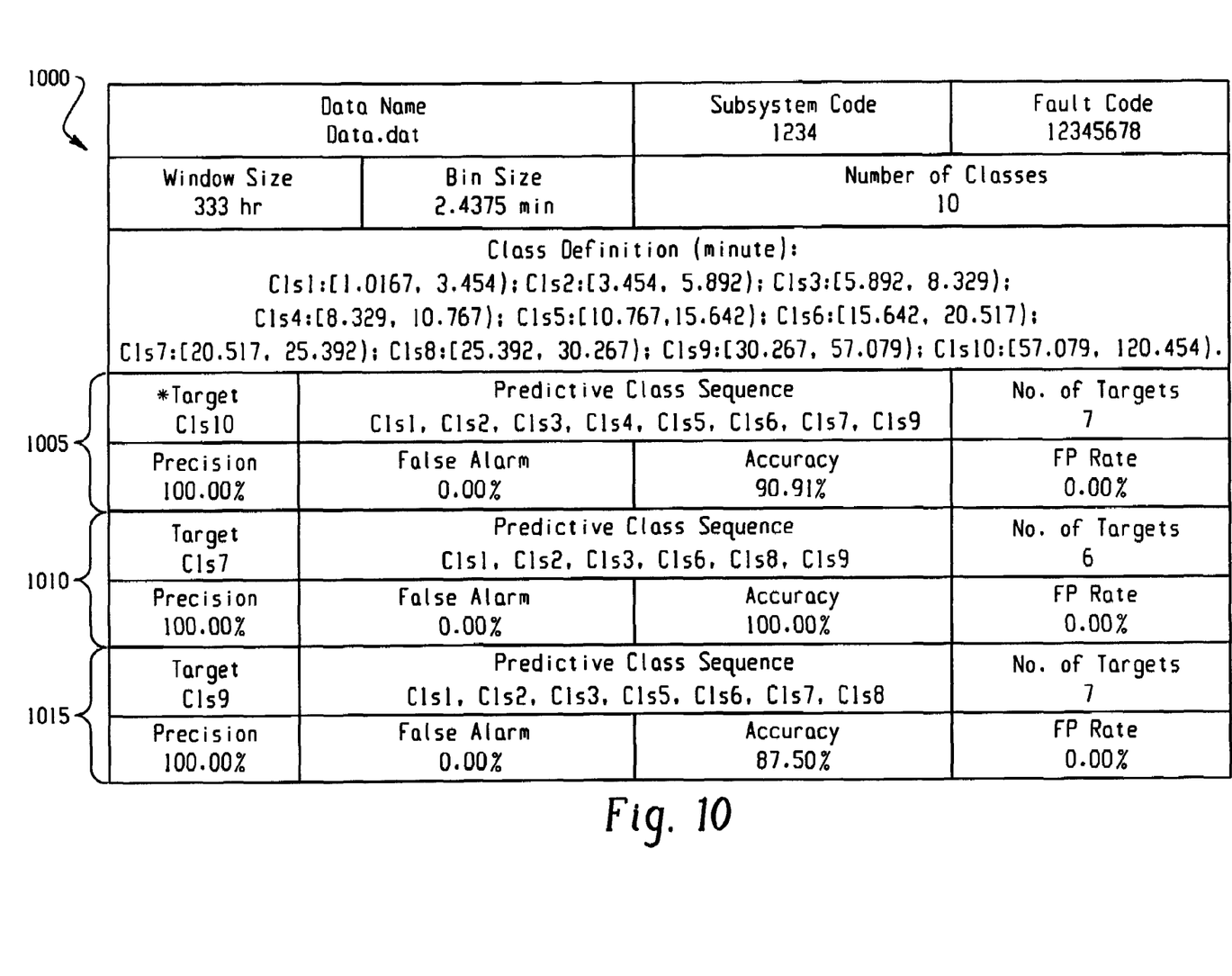
FIG. 10 depicts empirical results in accordance with an embodiment of the invention.

Referring now to FIG. 8, which represents a temporal series 800 of the six event classes as a, b, c, d, e and f, with event class f being the target event, the algorithm methodology looked for all analysis windows 805 preceding a target event f, and then used these windows to generate the event space. By using the event space, frequent event sets and confident event sets were found, and preliminary prediction rules established. A genetic algorithm was then used to optimize the system parameters selected for the analysis. An exemplary confusion matrix 900 used for this analysis is depicted in FIG. 9. Upon establishing the finalized prediction rules, the data in FIGS. 5A and 5B above 3200 samples was used to test out the methodology and effectiveness of the finalized prediction rules, which is shown in the table 1000 of FIG. 10. It will be noted that FIG. 10 illustrates ten event classes, while FIG. 7 illustrates six event classes. This difference may result from optimization, which may dynamically change number of event classes. In FIG. 10, and for this example only, the sliding analysis window size was 333 hours, the histogram bin size was 2.4375 minutes, the number of event classes was 10, and the lower and upper limits of each event class was defined as indicated under the heading "Class Definition (minute)".

In a first example analysis (reference numeral 1005), the target event class was Class-10, the finalized prediction rule (predictive class sequence) was Class-1, Class-2, Class-3, Class-4, Class-5, Class-6, Class-7 and Class-9, and the number of target events included in the analysis was 7. The result summary shows that this prediction rule has a Precision (Equation-10) of 100%, a False Alarm of 0.0%, and Accuracy (Equation-11) of 90.91%, and aFalse Positive Rate (Equation-12) of 0.0%.

In a second example analysis (reference numeral 1010), the target event class was Class-7, the finalized prediction rule (predictive class sequence) was Class-1, Class-2, Class-3, Class-6, Class-8 and Class-9, and the number of target events included in the analysis was 6. The result summary shows that this prediction rule has a Precision of 100%, a False Alarm of 0.0%, and Accuracy of 100.00%, and a False Positive Rate of 0.0%.

In a third example analysis (reference numeral 1015), the target event class was Class-9, the finalized prediction rule (predictive class sequence) was Class-1, Class-2, Class-3, Class-5, Class-6, Class-7 and Class-8, and the number of target events included in the analysis was 7. The result summary shows that this prediction rule has a Precision of 100%, a False Alarm of 0.0%, and Accuracy of 87.50%, and a False Positive Rate of 0.0%.

Depending on the application and the cost of incorrect predictions, it can be considered that a set of prediction rules resulting in a Precision greater than 80-90%, a False Alarm less than 5-10%, an Accuracy greater than 80%, and a False Positive Rate less than 5-10%, will yield an acceptable methodology for accurately predicting the probable occurrence of an identified target event.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as read-only memory (ROM), random access memory (RAM), and erasable-programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to forecast an event of interest, a target event, based on temporal patterns useful for predicting a probable occurrence of the target event.

As disclosed, some embodiments of the invention may include some of the following advantages: accurate prediction of the probable occurrence of a target event having a low frequency of occurrence and a high impact upon its occurrence; a robust, fast and accurate prediction of large events having ramifications in realizing tremendous cost savings via predictive maintenance; a methodology that seamlessly integrates the estimation of system parameters for classification and prediction by using genetic algorithms, which obviates the need for any manual trial and error setting for the classifier parameters by efficiently and rapidly searching for them automatically, thereby establishing a robust methodology that optimizes the system parameters for best accuracy in classification, and making the classification process more efficient and amenable for automatic data mining; and, a methodology that is equally applicable to a variety of disciplines, such as computer networks, fraudulent transactions in a financial institution, and prediction of machine downtime in manufacturing assembly lines.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for characterizing, detecting and predicting an event of interest, a target event, based on temporal patterns useful for predicting a probable occurrence of the target event, the method comprising:

defining measurable events and their features and quantizing them into event classes;

analyzing temporal series of the event classes, and establishing preliminary prediction rules by analyzing temporal patterns of the event classes that precede an occurrence of the target event using a sliding time window;

evaluating the quality of and optimizing parameters of the preliminary prediction rules using a defined fitness function, thereby defining finalized prediction rules;

making available the finalized prediction rules for application on a temporal series of the event classes to forecast a probable occurrence of the target event; and applying the finalized prediction rules on the temporal series of the event classes to forecast a probable occurrence of the target event.

2. The method of claim 1, further comprising:
agglomerating the quantized measurable events into event classes.

3. The method of claim 1, wherein the target event has a low frequency of occurrence, but a high impact upon its occurrence, relative to all of the other event classes.

4. The method of claim 1, wherein the event classes include both the target event and non-target events, and only the non-target events are used to define the finalized prediction rules.

5. The method of claim 1, wherein the event classes result from more than one data set, thereby enabling multivariable predictions.

6. The method of claim 1, wherein the quantizing the defined measurable events into event classes comprises:
merging neighboring data points defining the measurable events until a defined number of event classes are established.

7. The method of claim 1, wherein the defined fitness function is defined to vary as a function of a confusion matrix.

8. The method of claim 1, further comprising:
in response to the forecasted probable occurrence of the target event, enabling a machine health management system to take action to prevent a future occurrence of the target event or to prepare for a resolution if the target event were to occur, thereby transforming the measurable events into an identifiable actionable event.

9. The method of claim 8, wherein:
the actionable event comprises preventative maintenance of a machine, a device or a network.

10. The method of claim 1, wherein related events are defined as the event classes in the sliding window that precede an occurrence of the target event, and the temporal order of the related events is not considered in defining the finalized prediction rules.

11. The method of claim 10, wherein the evaluating the quality of the preliminary prediction rules comprises:
using the sliding window, analyzing the temporal series of the event classes to find an analysis time window containing a set of related events;
determining whether a target event is present in the next sequential time window, and based OD this information, computing four values of a two-by-two confusion matrix; and
using the four values to compute a fitness score based on the fitness function.

12. The method of claim 10, wherein the establishing the preliminary prediction rules comprises:
analyzing the temporal series of the event classes to find all analysis time windows preceding the target event;
extracting sets of the related events from the analysis time windows;
using the sets of related events, constructing an event space containing all possible event patterns generated by the sets of related events;
using the event space, finding all frequent event sets, the frequent event sets being defined as an event set with a frequency of occurrence larger than a pre-defined minimum;
using the event space, finding confident event sets, the confident event sets being defined as an event set with a confidence measure for predicting the occurrence of the target event larger than a pre-defined minimum; and
defining target event predictors as the intersection of both the frequent event sets and the confident event sets.

13. The method of claim 12, wherein the optimizing comprises:
defining a set of system parameters relating to the event classes, and encoding the system parameters to define an encoded chromosome; and
employing a genetic algorithm to assess the value of the system parameters within the encoded chromosome by applying a first valuation method and a second valuation method.

14. The method of claim 13, wherein:
the first valuation method comprises evaluating a frequency score and a confidence score associated with each target event predictor.

15. The method of claim 13, wherein:
the second valuation method comprises evaluating a confusion matrix associated with each target event predictor.

16. The method of claim 12, wherein the optimizing comprises:
defining a set of system parameters relating to the event classes, encoding the system parameters to define an encoded chromosome, and defining the fitness function such that it varies as a function of the length of the encoded chromosome.

17. The method of claim 16, wherein:
the encoded chromosome comprises a binary string having a plurality of binary string segments, each segment defining a unique one of the system parameters, and several chromosomes are capable of being encoded together to solve multivariable input problems.

18. The method of claim 17, wherein:
one of the segments defines one of: a size of the sliding window; a bin size of a histogram of the measurable events; a number of the event classes; and, the target event class.

19. The method of claim 16, wherein the optimizing comprises:
employing a genetic algorithm to assess the value of the chromosome by calculating a set of scores that are a function of a confusion matrix, process parameters, and algorithm parameters.

20. The method of claim 19, wherein the set of scores comprises at least one of a precision score, an accuracy score and a false positive rate score.

21. The method of claim 20, wherein the optimizing comprises:
employing a genetic algorithm to select values for the system parameters for the encoded chromosome through optimization of the fitness function.

22. The method of claim 21, wherein the fitness function is defined as:

$$fit = S_1 * S_2 * (1-S_3) S_4 * len;$$

where:
$S_1$ is the precision score;
$S_2$ is the accuracy score;
$S_3$ is false positive rate score;
len is the length of the chromosome; and
$S_4$ is defined as:
$S_4 = f + cf,$
where:
f is a frequency score; and
cf is a confidence score;

wherein each target event predictor has an associated frequency score based its frequency of occurrence, and an associated confidence score based on its confidence measure.

23. A computer usable medium having computer readable program code for characterizing, detecting and predicting an event of interest, a target event, based on temporal patterns useful for predicting a probable occurrence of the target event, the computer readable program code executable by a computer for facilitating:

defining measurable events and their features and quantizing them into event classes;

analyzing temporal series of the event classes, and establishing preliminary prediction rules by analyzing temporal patterns of the event classes that precede an occurrence of the target event using a sliding time window;

evaluating the quality of and optimizing parameters of the preliminary prediction rules using a defined fitness function, thereby defining finalized prediction rules; and making available the finalized prediction rules for application on a temporal series of the event classes to forecast a probable occurrence of the target event.

* * * * *